United States Patent [19]

Krall

[11] Patent Number: 4,505,524

[45] Date of Patent: Mar. 19, 1985

[54] THRUST BEARING AND METHOD OF MAKING SAME

[75] Inventor: Donald J. Krall, Hudson, Ohio

[73] Assignee: Kendale Industries, Inc., Valley View, Ohio

[21] Appl. No.: 515,589

[22] Filed: Jul. 21, 1983

[51] Int. Cl.³ .............................................. F16C 19/10
[52] U.S. Cl. .................................. 384/615; 29/148.4 A
[58] Field of Search ............... 308/219, 227, 230, 233, 308/232, 187.2; 29/148.4 A, 148.4 R

[56] References Cited

U.S. PATENT DOCUMENTS

| 2,127,149 | 8/1938 | Whitney et al. | 301/5.7 |
|---|---|---|---|
| 3,142,085 | 7/1964 | Black | 308/230 |
| 3,318,645 | 5/1967 | Sutowski | |
| 3,934,956 | 1/1976 | Pitner | 308/227 |
| 3,998,505 | 12/1976 | Frost et al. | 308/189 R |
| 4,196,947 | 4/1980 | Ziegler | 308/227 |
| 4,398,329 | 8/1983 | Hitchner | 29/148.4 R |

Primary Examiner—Lenard A. Footland
Attorney, Agent, or Firm—Woodling, Krost, Rust & Hochberg

[57] ABSTRACT

A bearing assembly comprised of a first race member (11), a second race member (12), a plurality of ball bearings (13) therebetween, and a keeper member (14) around the second race member and formed to embrace the outer portion of the second race member and to overlay the first race member to prevent the separation of the race members but leaving a clearance (15) between the keeper member and first race member to permit free rotative movement of one race member relative to the other.

11 Claims, 3 Drawing Figures

THRUST BEARING AND METHOD OF MAKING SAME

FIELD TO WHICH INVENTION RELATES

The invention relates to ball bearing assemblies, and particularly thrust type ball bearing assemblies, and to the method of making the same.

BACKGROUND ART OF THE INVENTION

The related background art known to the Applicant is the art of ball bearing assemblies and to the method of making the same, such as shown in U.S. Pat. No. 3,318,645; No. 3,998,505; and No. 2,127,149. The assembly and method of making the same disclosed and claimed in the instant application are distinctly different from the disclosures in those recited prior patents.

STATEMENT OF THE INVENTION

An object of the invention is to provide an improved bearing assembly, particularly of the thrust bearing type, having a unique arrangement for locking the several parts together and which lends itself to efficient manufacture of the same.

Another object is the provision of a bearing assembly so arranged that disfigurement of the races by the balls from axially directed pressure is diminished.

Another object is the provision of a bearing assembly having race members formed with flanges to resist distortion during heat treating.

Another object is the provision of a unique arrangement of race members and the keeper member keeping the race members in assembled condition without the race members unduly binding the balls between them.

Another object is the provision of a novel and unique method of making a ball bearing assembly having improved characteristics.

Other objects and advantages may be observed from the following description of the invention in conjunction with the several views of the drawing.

FIGURES OF THE DRAWING

DESCRIPTION OF THE INVENTION

Figure 1:
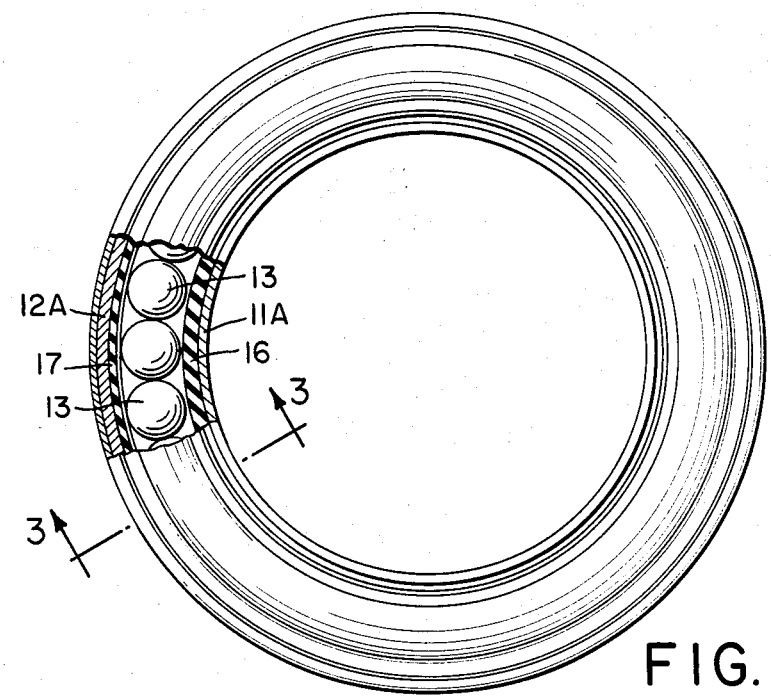
FIG. 1 is a plan view of a bearing assembly embodying my invention looking in the direction of the arrows 1—1 of FIG. 2, and partially cut away to show the interior of the bearing assembly.
Figure 2:
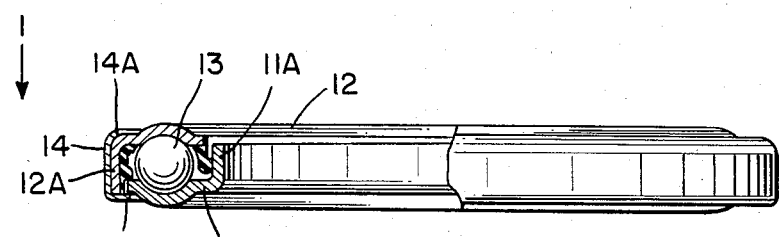
FIG. 2 is a side view of the bearing assembly shown in FIG. 1, and showing a cross section through the bearing assembly at one side as illustrated.

My assembly incorporates a first race member 11, preferably of steel. The race member 11 has a raceway portion in a plane normal to the axis of the bearing unit, and form its inner periphery there is an integrally formed flange 11A disposed in a cylindrical form concentric with the axis of the unit. As seen in FIG. 2, the flange 11A extends upwardly substantially beyond a reference plane normal to said axis of the unit and passing through the centers of all of the balls 13 arranged in a circle in the bearing unit.

The flange 11A on race member 11 aids in preventing or limiting distortion or warping of the raceway 11 during the usual heat treating of the steel raceway. The flange 11A is innermost of the unit, that is, closer to the unit axis and thus the race member may be referred to as the innermost race member.

Also included in my bearing assembly is a second race member 12 of steel. Extending downwardly from the outermost part the raceway portion of the second race member 12 is an integrally formed flange 12A. The flange 12A is of cylindrical shape and is concentric with the axis of the bearing unit. The flange 12A extends downwardly to a plane normal to the axis of the unit beyond a reference plane normal to the axis of the unit and passing through the centers of the plurality of ball bearings 13 interposed as shown between the first and second race members.

The plane of the uppermost edges of flange 11A and the plane of the lowermost edge of flange 12A are parallel to, and on opposite sides of, the said reference plane through the centers of the ball bearings 13, as seen in FIG. 2.

The plurality of ball bearings 13 arranged in the usual manner in a circle substantially occupy the annular space between the race members 11 and 12 and are in rolling engagement with the opposing faces of the raceway portions of the race members.

The race members 11 and 12 are stampings of low carbon steel. To provide the race members 11 and 12 with a hard, smooth and regular surface engaged by the ball bearings 13, the race members 11 and 12, prior to their assembly in the unit, are heat treated. As stated, the flanges 11A and 12A aid in resisting distortion and warping of the race members which would otherwise occur from a heat treating process.

The plurality of balls 13 in a circle are in close rolling relationship with the opposed facing surfaces of the raceway portions of the race members 11 and 12. The ball bearings 13 are intermediate, and spaced from, the flanges 11A and 12A as seen in the drawing.

As seen in the drawing, there is an annular gap or space between the flange 11A and the radially innermost portion of the raceway portion of race member 12. Also, there is an annular gap or space between the flange 12A and the radially outermost portion of the raceway portion of race member 11. These concentric annular gaps or spaces permit free rotative movement of one race member relative to the other and without frictional resistance.

One of the race members may be rotatively movable relative to the other. For example, the race member 11 may be rotatively moveable with a rotatable shaft to which it is secured while the race member 12 may be relatively fixed such as by being fixed to a supporting structure. Or, for example, the race member 12 may be rotatively movable while the race member 11 may be relatively fixed as by being mounted on a non-rotating shaft.

To keep or hold the two race members 11 and 12 together with the ball bearings 13 in proper position between them as shown in the drawing, is a metal keeper 14 of annular form. This keeper of deformable metal is cup-shaped in that it has a cylindrical body shape and a partially closed bottom. The cylindrical body portion of keeper 14 is concentric with the axis of the unit and complements the outer surface of flange 12A of race member 12. There is a close or tight fit between the cylindrical portion of keeper 14 and flange 12A.

The upper or top edge portion 14A is formed or extended inwardly, by deformation of the metal of the keeper, over and adjacent the upper surface of race member 12 and in alignment with flange 12A. The lower or bottom edge portion 14B of keeper 14, disposed in a plane normal to the axis of the unit, extends under, and in close engagement with the lower surface of the bottom edge of flange 12A.

Thus, the flange 12A is tightly embraced around its circumference by the cylindrical body portion of keeper 14. Also, the race member 12, and particularly flange 12A, is tightly embraced by the top edge portion 14A and the bottom edge portion 14B of keeper 14 whereby the keeper 14 is firmly secured to race member 12.

Figure 3:
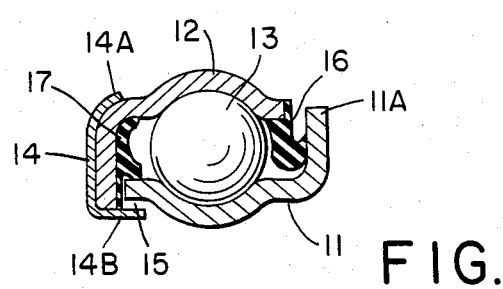
FIG. 3 is an enlarged view taken through the cross-section 3—3 of FIG. 1.

The bottom edge portion 14B of keeper 14 not only extends under, and in close engagement with, the bottom edge of flange 12A but also extends radially inward under the radially outermost edge portion of race member 11 as better seen in FIG. 3. This locks or keeps the two race members 11 and 12 together in the assembled condition shown in the drawing.

Although the lower edge portion 14B extends radially inward to overlay the race member as shown so as to keep the parts in assembled relationship, the radially extending portion 14B does not engage the race member 11. Rather, there is a definite clearance, indicated by the reference character 15 in FIG. 3, between the radially extending portion 14B and the race member 11. This clearance or annular space 15 is important in assuring that there is no frictional engagement at that place which would interfere with, or which would limit, the free relative rotative movement between the race members.

The maintenance of this important clearance 15 is obtained and assured by having the opposed pressing forces imposed in assembling the keeper 14 on the race member 12 directed upwardly on portion 14B and downwardly on portion 14A so as to bend over or deform the portion 14A in embracing flange 12A therebetween. The flange 12A is deep enough, that is, extends downwardly sufficiently in an axial direction that the pressing upward action of bottom portion 14B of the keeper, while pressing upper portion 14A downwardly, is directed upwardly against the bottom edge of flange 12A and not against the race member 11. By properly dimensioning the parts, the obtaining and maintaining of the important clearance 15 is assured.

To guard the balls 13 positioned between the race members annular seal members 16 and 17 may be positioned between the race members at the location of the annular gaps between them at the location shown in the drawing. The seal members preferably are of artificial rubber or elastomeric material, such as Buna-B, resistant to deterioration by oil or grease. The seal members 16 and 17 are self sustaining in form but are slightly yieldable for ease in assembling.

The seal member 17 may be bonded in position to the inner surface of race member 12. Also, if desired, the seal member 16 may be bonded to either race member 11 or 12 before assembling the parts. Such bonding of the seal members to the race members facilitates the assembling of the race members with the ball bearings therebetween, and also helps hold the seal members in place. The material of the seal members is such that they do not present appreciable frictional resistance to free rotative movement of one race member relative to the other.

The seal members serve the purpose of guarding the ball bearings 13 against dust or other foreign material entering between the race members to the ball bearings. The seal members also help to retain grease or other lubricant placed between the race members in engagement with the ball bearings from escaping from the assembly.

To make the bearing unit the described race members are stamped from low carbon steel to the configuration shown. The race members are then preferably heat treated. The race members with seal members mounted in the position shown are then brought together with the ball bearings positioned therebetween. This assembly is then placed downwardly into an open ended keeper member, that is before the top edge portion 14A has been bent or formed inward. The bottom edge portion 14B of the keeper is rested on an anvil or fixed part of a press. The ram of the press is then brought down to bend or form the upper bent-over or deformed upper end portion 14A to tightly embrace the flange 12A between upper portion 14A and lower portion 14B.

This action of the press in pressing portions 14A and 14B together to embrace flange 12A, however, because of the dimensions of the press, maintains the clearance 15 between the race members and avoids pressing of portion 14B into engagement with race member 11 and prevents frictional resistance therebetween.

If the force of the press assembling the parts as described were brought to bear on the race member 11 (by omission of clearance 15) so as to force the race members toward each other with ball bearings therebetween, there is a danger that the balls would be forced to indent or dimple the raceway surfaces of the race members and thus cause an uneven or irregular rolling surface for the ball bearings between the race members. By assuring the maintenance of the clearance 15 in the forming of the keeper 14 to embrace the flange 12A between bottom portion and upper portion of keeper 14, this danger is averted or minimized.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a bearing unit comprised of a first race member and a second race member spaced apart in axial alignment with a plurality of ball bearings therebetween and in rolling engagement with the race members, the improvement of each of said race members having a flange extending substantially parallel to the axis of the bearing unit and accommodating the ball bearings between the flanges, and a cup-shaped annular keeper embracing the outermost of said race members, said annular keeper having a first end portion flanged and extending radially inward adjacent one end of the outermost of said race members to limit axial movement of the said outermost race member, said keeper member having a second end portion spaced in an axial direction from said first end portion, said second end portion extending radially inward adjacent an opposite end of the said outermost race member to embrace the outermost race member between the first end portion and the second end portion and the second end portion of said annular keeper, said second end portion of the keeper member being spaced from the peripheral outer edge portion of the innermost of said race members to provide clearance therebetween.

2. The improvement claimed in claim 1 and annular sealing members each interposed between the flange of each race member and the other of the race members.

3. The improvement claimed in claim 1 and in which said seal members are composed of Buna-B rubber like material.

4. In a bearing unit having a first race member and an axially aligned second race member adapted to accommodate a plurality of ball bearings interposed therebetween and in rolling engagement with the race members, the first race member having a flange of cylindrical form extending in an axial direction radially inward of the ball bearings extending to a first plane normal to the axis of the unit, the second race member having a flange of cylindrical form extending in an axial direction radially inward of the ball bearings to a second plane normal to the axis of the unit, said first plane and said second plane being spaced from, and disposed on opposite sides of, an intermediate plane normal to the axis of the unit and passing through the centers of said ball bearings, and an annular keeper member having a cup shape, said keeper member embracing said second race member, the keeper member having axially spaced end portions disposed radially inward at the opposite axial ends of the flange of the second race member to hold the same therebetween, the keeper member overlapping the peripheral edge portion of the first race member to retain the first race member assembled in the unit with the second race member but spaced therefrom to permit free rotative movement of the race member relative to each other.

5. A bearing unit claimed in claim 4 and in which there is a gap between the flange of the first race member and the second race member and a gap between the flange of the second race member, and including a seal member disposed in the gap between the flange of the first race member and the second race member to guard the ball bearings in the unit, and a seal member disposed in the gap between the flange of the second race member and the first race member.

6. A bearing unit claimed in claim 5 and in which said seal members are rubber-like yieldable material having a cross sectional form to fill the gaps and to maintain sealing engagement with the flange of the first race member and with the second race member, and to maintain sealing engagement with the flange of the second race member and with the first race member.

7. In a thrust bearing unit having a first race member and a second race member having a plurality of ball bearings disposed in a circle therebetween, and in rolling engagement with, the race members, there being a reference plane normal to the axis of the unit through the centers of said ball bearings, said first race member having an inner cylindrical flange extending to a first plane normal to the axis of the unit and extending upwardly beyond said reference plane, said second race member having an outer cylindrical flange extending to a second plane normal to the axis of the unit and extending downwardly beyond said reference plane, said first and second planes being disposed on opposite sides of said reference plane, said cylindrical flanges of the first and second race members being concentrically arranged, and a metal annular keeper member embracing said second race member, the keeper member at a first axial end extending over the second race member and at a second axial end extending under the second race member to embrace the second race member, said keeper member at the second axial end thereof also extending radially inward to overlap the first race member to keep the first race member assembled with the second race member in the unit, said keeper member in overlapping the first race member clearing the first race member to permit rotation of the first race member relative to the keeper member.

8. The bearing unit claimed in claim 7 and in which there is an annular first gap between the flange of the first race member and the inner peripheral edge portion of the second race member, and an annular second gap between the flange of the second race member and the outer peripheral edge portion of the first race member, the gaps permitting relative rotative movement between the race members.

9. The bearing unit claimed in claim 8, and including annular sealing members disposed in said gaps to enclose the ball bearings between the race members.

10. The method of making a ball bearing unit providing a first race member having a cylindrical flange formed adjacent its inner radial peripheral edge, providing a second race member having a cylindrical flange formed adjacent its outer peripheral edges, positioning ball bearings arranged in a circle between the race members, positioning the assembled race members and ball bearings into an open end keeper member having a bottom radially extending portion disposed below the flange of the second race member, resting the radially extending portion of the keeper member on an anvil, pressing the upper portion of the keeper member downwardly and radially inward over the top of the flange of the second race member to tightly embrace the said flange of the second race member, and maintaining a clearance between the bottom portion of the keeper member and the first race member to permit free rotative movement of one race member relative to the other.

11. The method claimed in claim 10 and including the positioning of a first seal member between the flange of the first race member and the second race member, and positioning a second seal member between the flange of the second race member and the first race member.

* * * * *